United States Patent
Brevoort et al.

(10) Patent No.: US 11,659,021 B2
(45) Date of Patent: May 23, 2023

(54) ASYNCHRONOUS DISTRIBUTED MODULAR FUNCTION CALLING

(71) Applicant: Slack Technologies, LLC, San Francisco, CA (US)

(72) Inventors: Michael Brevoort, Littleton, CO (US); Stephen Wood, Mill Valley, CA (US); Allen James Ferrick, San Francisco, CA (US); Brad Harris, Castle Rock, CO (US); Leslie Newell, Aurora, CO (US); Melissa Khuat, San Francisco, CA (US)

(73) Assignee: SlackTechnologies, LLC, San Francisco, CA (US)

( * ) Notice: Subject to any disclaimer, the term of this patent is extended or adjusted under 35 U.S.C. 154(b) by 0 days.

(21) Appl. No.: 17/582,486

(22) Filed: Jan. 24, 2022

(65) Prior Publication Data

US 2022/0232061 A1    Jul. 21, 2022

Related U.S. Application Data

(63) Continuation of application No. 17/152,464, filed on Jan. 19, 2021, now Pat. No. 11,245,744.

(51) Int. Cl.

| | |
|---|---|
| *H04L 67/02* | (2022.01) |
| *H04L 41/22* | (2022.01) |
| *H04L 67/306* | (2022.01) |
| *H04L 67/60* | (2022.01) |
| *H04L 67/133* | (2022.01) |
| *H04L 67/104* | (2022.01) |

(52) U.S. Cl.
CPC .............. *H04L 67/02* (2013.01); *H04L 41/22* (2013.01); *H04L 67/1044* (2013.01); *H04L 67/133* (2022.05); *H04L 67/306* (2013.01); *H04L 67/60* (2022.05)

(58) Field of Classification Search
CPC ..... H04L 67/02; H04L 67/60; H04L 67/1044; H04L 67/133; H04L 67/306; H04L 41/22; G06F 9/542
See application file for complete search history.

(56) References Cited

U.S. PATENT DOCUMENTS 6,954,220 B1 * 10/2005 Bowman-Amuah ........................ G06F 16/972
715/740
9,417,938 B2 * 8/2016 Aguilera ................. G06F 9/547
(Continued)

OTHER PUBLICATIONS

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
(Continued)

*Primary Examiner* — John M MacIlwinen
(74) *Attorney, Agent, or Firm* — Erise IP, P.A.

(57) ABSTRACT

A computer-readable media, method, and system for calling a function within a group-based communication system. The function may be initiated according to a trigger condition and is associated with arguments and return values. To carry out the function, an HTTP request is generated and sent to an HTTP server, which sends an HTTP callback to a group-based communication system server. The HTTP callback may include return values indicative of either a successful completion of the function or an error.

20 Claims, 10 Drawing Sheets

(56) References Cited

U.S. PATENT DOCUMENTS

| | | | |
|---|---|---|---|
| 2006/0150119 | A1 | 7/2006 | Chesnais |
| 2008/0034040 | A1 | 2/2008 | Wherry |
| 2010/0242055 | A1 | 9/2010 | Aguilera |
| 2017/0289069 | A1* | 10/2017 | Plumb ..................... H04L 51/04 |
| 2017/0366621 | A1* | 12/2017 | Sagar ..................... H04L 51/02 |
| 2018/0287982 | A1 | 10/2018 | Draeger et al. |
| 2019/0066694 | A1 | 2/2019 | Hirzel |
| 2019/0370237 | A1* | 12/2019 | Cheru ................ G06F 16/2474 |
| 2020/0259891 | A1* | 8/2020 | Abraham ............ H04L 67/1008 |
| 2021/0065121 | A1 | 3/2021 | Brehmer |
| 2021/0119944 | A1* | 4/2021 | Kim ........................ G06F 40/35 |
| 2021/0132960 | A1* | 5/2021 | Whitten .............. G06F 9/44505 |
| 2022/0198531 | A1* | 6/2022 | Cleaver .............. G06Q 30/0282 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (Bits), Lexisnexis, https://advancelexis.com/api/permalink/3eb84b34-a8f9-4d7d-9573-89d9598a4963/?context=100516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

WIPO Application No. PCT/US2021/013987, International Search Report and Written Opinion of the International Searching Authority, dated Oct. 19, 2021.

"Build The art of crafting a Slack app your team will love", Dec. 3, 2020 (Dec. 3, 2020), XP055848755, Retrieved from the Internet: URL:https://web.archive.org/web/20201203090146if_/https://slack.dev/guides/Build.pdf [retrieved on Nov. 2, 2021].

"Using the Calls API I Slack", Nov. 2, 2020 (Nov. 2, 2020), XP055848720, Retrieved from the Internet: URL:https://web.archive.org/web/20201102045700/https://api.slack.com/apis/calls [retrieved on Nov. 2, 2021].

"Handling user interaction in your Slack apps I Slack", Dec. 3, 2020 (Dec. 3, 2020), XP055848722, Retrieved from the Internet: URL:https://web.archive.org/web/20201024232625/https://api.slack.com/interactivity/handling [retrieved on Nov. 2, 2021].

"Slack: Bolt for JavaScript", Dec. 3, 2020 (Dec. 3, 2020), XP055848725, Retrieved from the Internet: URL:https://web.archive.org/web/20201203044650/https://slack.dev/bolt-js/concepts [retrieved on Nov. 2, 2021].

"Workflow Builder: Steps from apps", Dec. 4, 2020 (Dec. 4, 2020), XP055848727, Retrieved from the Internet: URL:https://web.archive.org/web/20201030182532/https://api.slack.com/workflows/steps [retrieved on Nov. 2, 2021].

Urquhart Rodney: "Rewriting the Slack Python SOK—Slack Engineering", 2019, XP055848748, Retrieved from the Internet: URL:https://slack.engineering/rewriting-the-slack-python-sdk/ [retrieved on Nov. 2, 2021].

Pot, Justin. "How to build your own Slack bot". https://zapier.com/blog/how-to-build-chat-bot/. Jun. 2020. pp. 1-15. (Year: 2020).

Haughey, Matt. "Mind the bot: a guide to Slackbot custom responses". https://slack.com/blog/productivity/mind-the-bot-a-guide-to-slackbot-custom-responses. (Year: 2018).

Saxena, Akanksha. "Cool way to add Custom Commands in Slack, without writing code". https://learn.viasocket.com/want-slack-to-take-action-as-per-your-commands-9722176983d5. pp. 1-8. (Year: 2017).

Vaziri, Mandana et al. "Generating chat bots from web API specifications". In Proceedings of the 2017 ACM SIGPLAN International Symposium on New Ideas, New Paradigms, and Reflections on Programming and Software (Onward! 2017). Association for Computing Machinery, New York, NY, USA, 44-57. (Year: 2017).

Asjes, Paul. "Building Slack Bots". 2016 Packt Publishing. Excerpt from chapters 1, 2, 3, 4, 6, and 7. pp. 1-78. (Year: 2016).

"Asynchronous HTTP with async-http-client in Java". https://www.baeldung.com/async-http-client. pp. 1-9. (Year 2019).

* cited by examiner

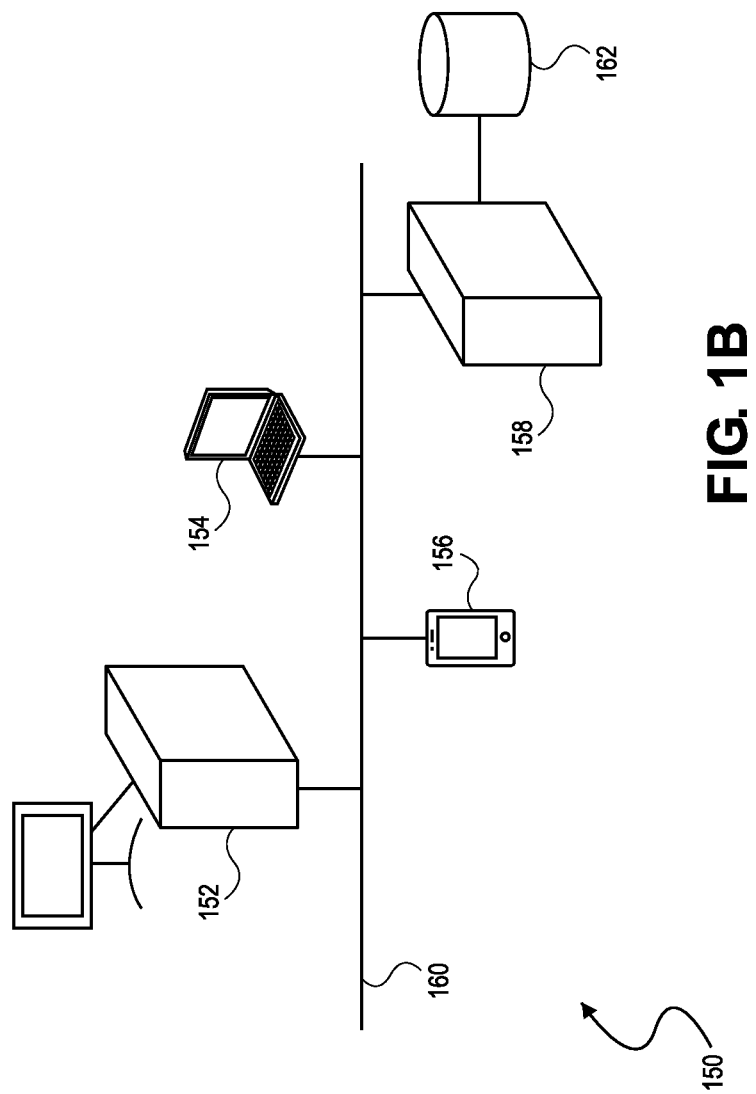

```
300
Function {
        ID              310
308  Name    String              312
        RequiresSession  Boolean
        Arguments    [ ]Argument {
                Name   String
                Label  String
                Type   FunctionInputType
        302  Validation    Expression
                Required       Boolean
                DefaultValue   String
        }
        Outputs      [ ]Output {
                Name   String
        306  Type   FunctionInputType
                Value  String
        }
}
```

FIG. 3B

ASYNCHRONOUS DISTRIBUTED MODULAR FUNCTION CALLING

RELATED APPLICATION

This application is a continuation application and claims benefit of U.S. patent application Ser. No. 17/152,464, filed Jan. 19, 2021, the disclosure of which is incorporated herein by reference in its entirety.

TECHNICAL FIELD

Embodiments of the invention relate to calling functions. More specifically, embodiments of the invention relate to calling functions within a group-based communication system.

Typically, group-based communication systems do not provide a way for end users to store custom functions that may be later shared or called by others. Accordingly, the actions of calling and composing functions may be limited to advanced developer users. Further, some group-based communication systems do not provide custom functions that are easily reusable or accessible by others for communicating and carrying out operations within external applications. As a result, modularity within such group-based communication systems may be reduced.

What is needed is a function calling convention within a group-based communication system that allows both standard end users and advanced developer users to call and compose functions and to be able to share and re-use them from within the group-based communication system.

SUMMARY

Embodiments of the invention solve the above-mentioned problems by providing a function calling convention within a group-based communication system. Specifically, embodiments of the invention provide a computer-readable media, method, and system for calling a function within a group-based communication system.

A first embodiment of the invention is directed to one or more non-transitory computer-readable media storing computer-executable instructions that, when executed by a processor, perform a method for calling a function within a group-based communication system, the method comprising the steps of receiving an indication, via an event channel in a group-based communication system, in response to a trigger for the function, receiving one or more arguments for the function, generating an asynchronous request including an identifier for the function and the one or more arguments for the function, receiving a callback including one or more return values for the function, and in response to determining that the one or more return values for the function indicate a successful completion of the function, generating a success event in the event channel in the group-based communication system.

A second embodiment of the invention is directed to a method for calling a function within a group-based communication system, the method comprising the steps of receiving an indication, via an event channel in a group-based communication system, in response to a trigger for the function, receiving one or more arguments for the function, generating an asynchronous request including an identifier for the function and the one or more arguments for the function, receiving a callback including one or more return values for the function, and in response to determining that the one or more return values for the function indicate a successful completion of the function, generating a success event in the event channel in the group-based communication system.

A third embodiment of the invention is directed to a function calling system for a group-based communication system, the system comprising a data store, and a processor programmed to perform a method for calling a function within a group-based communication system, the method comprising the steps of receiving an indication, via an event channel in a group-based communication system, in response to a trigger for the function, receiving one or more arguments for the function, generating an asynchronous request including an identifier for the function and the one or more arguments for the function, receiving a callback including one or more return values for the function, and in response to determining that the one or more return values for the function indicate a successful completion of the function, generating a success event in the event channel in the group-based communication system.

Additional embodiments of the invention are directed to providing an end user interface allowing an end user to create a user-defined function and a developer interface allowing an advanced user to create a user-defined function.

Further still, embodiments are directed to communication between a group-based communication system server, an HTTP server, and an external application.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 1B depicts an exemplary diagram illustrating components of a system for carrying out embodiments of the invention;

FIG. 3B depicts an exemplary function object relating to some embodiments of the invention;

Figure 1A:
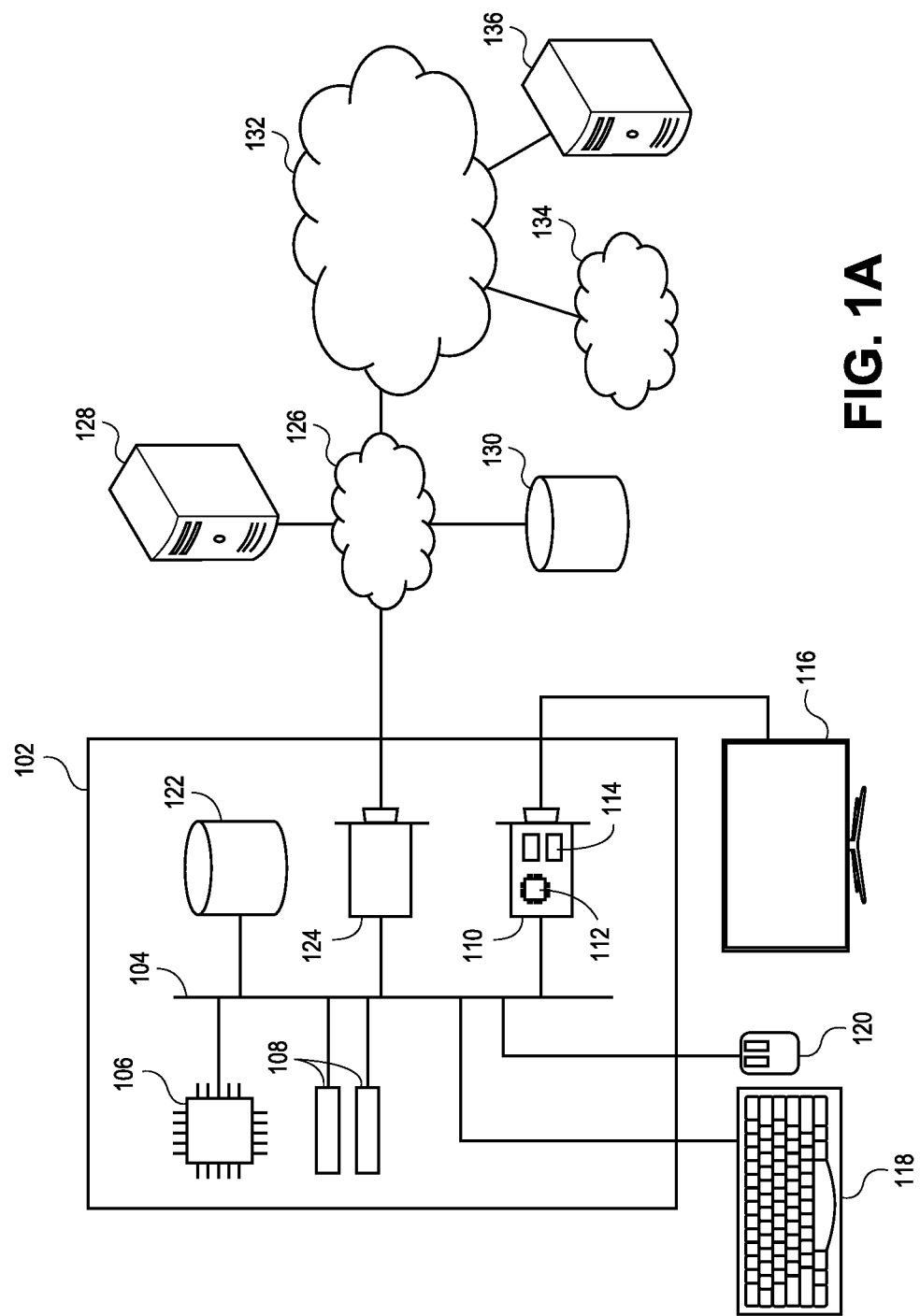
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1A, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Turning now to FIG. 1B, a system figure illustrating elements of a system 150 for carrying out embodiments of the invention is depicted. The system 150 comprises any number of client devices, such as client device 152, client device 154, and client device 156. As depicted in FIG. 1B, client devices 152, 154, and 156 may be any of a desktop computer, a laptop computer, a mobile phone, a tablet, or any other device suitable to allow a user to access the group-based communication system. The user may also switch from one client device to another, and may access the group-based communication system via multiple devices simultaneously. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some examples, the group-based communication system is a channel-based messaging platform having a plurality of messaging channels available to select users.

The system 150 further comprises a group-based communication system server 158 that acts as a host for the group-based communication system. The group-based communication system server 158 may be a dedicated server, a shared server, or any other form of computing device discussed above with respect to FIG. 1A. Although a single group-based communication system server 158 is depicted, embodiments with multiple such group-based communication system servers are also contemplated so as to provide scale, redundancy and/or isolation between different instances of the group-based communication system. For example, a particular organization that uses the group-based communication system may not wish to have its group-based communications system hosted on the same server as a competitor's group-based communication system for security reasons. Group-based communication system server 158 is communicatively coupled to client devices 152, 154, and 156 via network 160. Network 160 may be a local area network (LAN), wide-area network (WAN), virtual private network (VPN) or the Internet. Broadly speaking, any type of network for providing communication between the various components of system 150 is contemplated. Group-based communication system server 158 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client applications are also contemplated.

It should be understood that the group-based communication system as referred to herein may provide a communication platform for a plurality of users. In some embodiments, each user of the plurality of users may be associated with a specific organization. Said specific organization may be a small business, a corporation, or the like, as well as any other group of users. The group-based communication system is operable to provide communication services to any combination of users. For example, in some embodiments, communication services can be provided for a plurality of users from a single organization, as well as a plurality of users from a plurality of organizations. In some embodiments, a plurality of channels are present within the group-based communication system. Users may be added to each channel, such that users within one of the channels have access to messages and files posted within that channel. Further, users within the channel have the ability to post messages and upload files within the channel. In some embodiments, users may be added to a particular channel by an administrator, such as an administrator within a particular organization. Alternatively, in some embodiments, users may be added by any user within the channel. Further, in some embodiments, channel parameters such as who can add users may be set by the channel creator. For example, channels created by a particular organization may follow that organization's security policy, in which only administrators can add users to certain channels.

Group-based communication system data store 162 is communicatively connected to group-based communication system server 158. As depicted, group-based communication system data store 162 is directly connected to group-based communication system server 158; however, any form of communicative connection (for example, network-attached storage (NAS), a network file system (NFS), or cloud-based storage) can be employed. Broadly speaking, group-based communication system data store 162 stores all of the information used by group-based communication system server 158. For example, group-based communication system data store 162 may store all of the messages with their associated channels, documents and images uploaded to particular channels, channel membership information, and/or user information. As previously discussed, multiple group-based communication system servers may be present in system 150. In such embodiments, each group-based communication system server may have its own copy of group-based communication system data store 162. Alternatively, multiple group-based communication system servers may share a single network-attached group-based communication system data store. Alternatively or in addition, in any of these embodiments, data may be sharded across multiple group-based communication system data stores.

It should be understood that any of the client devices 152, 154, and 156, and the group-based communication system server 158 may comprise a processor, such as CPU 106 described with respect to FIG. 1A. Any of the operations described herein with respect to a processor may be carried out by the processors within any of the devices described herein. For example, in some embodiments, a processor within the group-based communication system server 158 may perform a first operation, while a processor within the client device performs a second operation.

Figure 2:
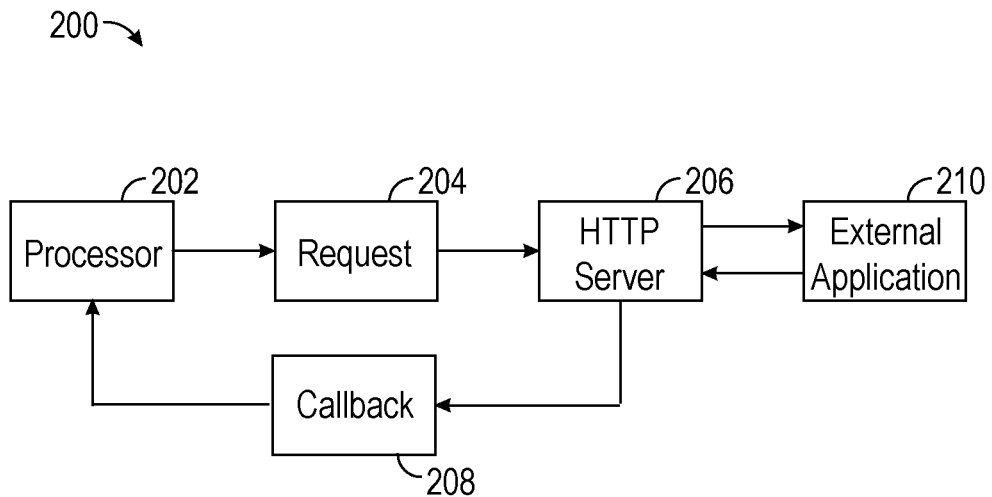
FIG. 2 depicts a function calling system relating to some embodiments of the invention.

Turning now to FIG. 2, a function calling system 200 is depicted relating to some embodiments. The function calling system 200 includes a processor 202 which may be a processor of the group-based communication system server 158 of FIG. 1B or a processor on one of client devices 152, 154, and 156. The processor 202 communicates an HTTP request 204 to an HTTP server 206, as shown. In some embodiments, the HTTP request 204 comprises an identifier for a function and one or more arguments for the function. The HTTP server 206 communicates an HTTP callback 208 to the processor 202. In some embodiments, communication between the processor 202 and the HTTP server 206 is established via an API endpoint. In some embodiments, the HTTP server 206 is a web server communicating over a network, such as network 160.

In some embodiments, the HTTP request is an asynchronous HTTP request where the processor continues execution after submitting the request as opposed to waiting for a response from the HTTP server 206. It should be understood that, while the terms "HTTP request," "HTTP server," and "HTTP callback" are used for concreteness, embodiments of the invention additionally contemplate any type of network protocol for communication between the group-based communication system and an external server for implementing function logic.

In some embodiments, the HTTP server 206 may communicate with an external application 210. The external application 210 may be a developer application or other application associated with the group-based communication system. For example, in some embodiments, the external application 210 is a third-party application referenced within the function. In some embodiments, the processor 202 may communicate with the HTTP server 206 to carry out a function solely within the third-party application. Alternatively, in some embodiments, at least a portion of the function may be carried out within the group-based communication system. In some embodiments, the external application 210 is implemented on an external server associated with the external application 210. Accordingly, at least a portion of the function may be carried out on the external application 210. For example, information may be written or retrieved from the external application 210 through communication with the HTTP server 206 and, in the case of information retrieval, retrieved information may be passed back to the processor 202 via the HTTP callback 208.

Figure 3A:
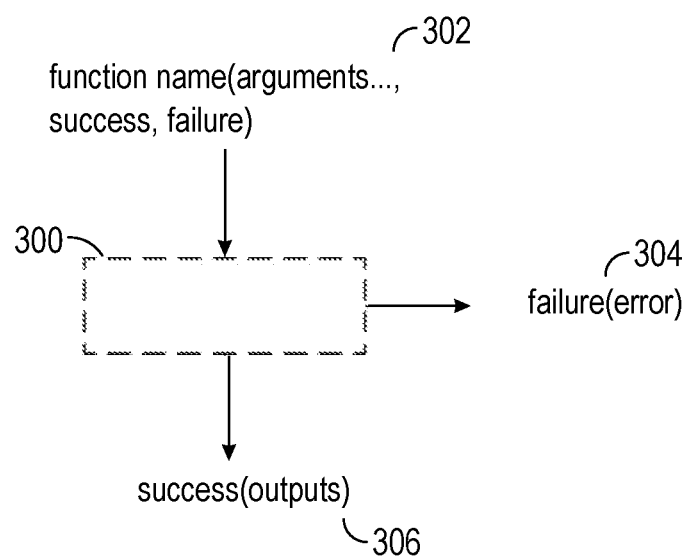
FIG. 3A depicts an exemplary function relating to some embodiments of the invention.

Turning now to FIG. 3A, an exemplary function 300 is depicted relating to some embodiments. The function 300 receives inputs 302 and in response to these inputs 302, generates either of an error 304 or outputs 306. The inputs 302 may include any of one or more arguments for the function, a name of the function, and other suitable information used to perform the function 300. The error 304 may be generated in response to a failure of the function 300. For example, if a required argument is not provided within the inputs 302 the function 300 may fail and generate the error 304. The error 304 may be returned to the group-based communication system server 158 and displayed as an error message on one of client devices 152, 154, and 156. Alternatively, outputs 306 may be generated by the function 300 in response to a success of the function 300. In some embodiments, the outputs 306 (and/or the error 304) may generate a success event (or, in the case of an error, a failure event) on an event channel in the group-based communication system, allowing users or automated processes to obtain results. As discussed below, this also allows functions to be composed by having an event on the event channel to serve as a trigger condition for another function. Alternatively or in addition, in some instances, either of the outputs 306 or the error 304 may be sent directly to a subsequent function as input arguments for the subsequent function, as is discussed in additional detail below in reference to FIG. 4.

In some embodiments, the inputs 302 may be received as arguments for the function 300. Further, inputs 302 may be received from the group-based communication system as message information. In some embodiments, an undercurrent of data may be associated with a particular channel of the group-based communication system. The undercurrent of data includes various information associated with the group-based communication channel, such as, for example, metadata for messages posted within the channel, user information associated with users added to the channel, and channel information, such as the channel name and channel parameters. Accordingly, any of the information from the undercurrent of data may be sent as an argument for the function. For example, a username and a time for a message may be used as arguments for a function to indicate which user sent the message and the time that the message was sent. Accordingly, a function is contemplated that identifies the last user to post a message within the channel.

In some embodiments, it may be desirable to utilize existing resources associated with the group-based communication channel for the function 300. For example, channel related information and features such as, access control, data scoping, subscriptions, APIs, data loss prevention integration, encryption key management, and international data residency integration may be called upon by the function to provide arguments or triggering events to initiate the function. Accordingly, the existing group-based communication channel may be used as an event channel for the function, where events within the channel may trigger functions, such as, for example, sending a message, adding a user, or reacting to a message. In some embodiments, any content published to the group-based communication channel may be used to trigger and supply arguments to a function.

In some embodiments, events may be published as event messages within a channel of the group-based communication system, where each event message comprises metadata describing the event. Accordingly, functions can be triggered based on events within the channel, as well as when an event message is reacted to or commented on. In some such embodiments, it may be desirable to publish event messages such that the metadata associated with the event message may be used to initiate and supply information to a function. Alternatively, in some embodiments, it may not be desirable to publish all events as event messages within the channel such that users receive too much unnecessary information. Accordingly, event messages may be filtered such that only certain types of events are published as event messages. Alternatively, event messages may be published to the undercurrent of data for the channel without being visible within the channel to users.

In some embodiments, the function 300 is an object in the context of the group-based communication system, such as an object within an object-oriented programming environment. Accordingly, the function 300 may be stored within a memory, such as the group-based communication system data store 162, and associated with an identifier used to identify the function 300. Further, in some embodiments, the function 300 may be authenticated by any of the processor 202, the HTTP server 206, or the external application 210. In some embodiments, the function 300 may be authenticated in one authentication step that meets the authentication requirements of each of the processor 202, the HTTP server 206, and the external application 210. Additionally, the function 300 may be authenticated along with a user who initiated the function. Accordingly, embodiments are contemplated where a user is authenticated by the group-based communication system and the user does not need to perform further actions to be authenticated by the HTTP server 206 and external application 210. Here, information relating to user authentication may be sent as an argument for the function. As such, if the user is authenticated within the group-based communication system then the user can run a function within the HTTP server 206 or the external application 210.

In some embodiments, the outputs 306 may comprise defining or updating at least one variable within the group-based communication system. For example, a successful function may update a variable saved in the group-based communication system data store 162. Accordingly, a function is contemplated that records the number of messages each user of a particular channel has sent within that channel by updating a counter for each user each time the user sends a message within the channel.

It is an advantage of embodiments of the invention that a function may be implemented independently of how the function was initially created and functions may be reused and altered to fit various different contexts. Accordingly, it is desirable that the interface for defining functions is relatively stable such that functions may be reused in varying contexts without returning errors. Further, flexibility in how functions are implemented should be maintained. For example, a function may be declared that takes a unique user identifier as an argument and returns a display name for that user. A first implementation of this function could take a group-based communication system username and look up a display name in a user database. That function interface could then be reused to take an email address and look up a display name in an LDAP directory. At a future point in time, the function could be reimplemented again to take a variety of different types of unique identifiers, automatically determine the type of user identifier and corresponding directory, and return a display name for any type of user identifier. This would allow existing uses of the function to continue to work without requiring any changes and regardless of the back-end implementation.

In one example, the function 300 may be a table creation function used to fill in values within a table or spreadsheet. Here, the inputs 302 may be variables or other parameters from either of the group-based communication system or the external application 210. Accordingly, the output 306 of the function 300 may comprise a table of information including the variables filled into specific locations within the table. For example, a function is contemplated that returns the email addresses of users who have been added to a particular channel within the group-based communication system over a certain time period, for example, over the last month. Here, the function retrieves variables from the group-based communication system indicative of the users who have been added over the last month and uses these variables as inputs 302 for the function to fill in the table.

It should be understood that various functions are contemplated for performing actions relating to tables, lists, spreadsheets, or other data structures such as writing data, reading data, inserting data, updating data, and deleting data. Accordingly, embodiments are contemplated for data driven applications where functions are used to interact with stored data structures such as tables, lists, or spreadsheets. Further, in some embodiments, changes to such data structures may be associated with a trigger event to initiate a function. Accordingly, embodiments are contemplated where a function is triggered upon a user updating a form, table, or list, or making changes to text within a document. It should be understood that said data structures may be stored on the group-based communication system data store 162 or otherwise may be stored on an external application.

In some embodiments, tables may be created to provide persistence capabilities to functions. Accordingly, a persistence table may be created when a given function is initialized to store arguments and event data. The event data may be stored such that it is retrievable by a subsequent function. Accordingly, embodiments are contemplated where a plurality of functions retrieve and update information stored in a persistence table. Further, in some embodiments, the event data may be retrievable by user to assist with error tracking for the function.

Turning now to FIG. 3B, the function 300 is depicted as a function object relating to some embodiments of the invention. In some such embodiments, an instance of the function 300 may be stored as an instance of a function object in the group-based communication system data store 162, as described above. The function 300 comprises a function ID 308 and a function name 310. Here, the function ID 308 and the function name 310 may be used to identify the function. For example, in some embodiments, the function ID 308 and the function name 310 are used to call the function 300. Accordingly, embodiments are contemplated where additional functions are called from within the outputs 306 of another function, as will be discussed below. For example, a first function may include a function ID or function name for a second function as an output such that the second function is called by the first function. In some embodiments, the function 300 further comprises a session required identifier 312 which indicates whether the function 300 requires a user session. The session required identifier 312 may comprise a Boolean variable such as true or false, where true indicates that a user session is required and false indicates that a user session is not required.

A user session as described herein may comprise an interactive session (for example, a presently active, in-focus user session) with a user to obtain user inputs which may be used as arguments or inputs 302 for the function. For example, a modal dialog may be presented to a user allowing the user to supply (directly or indirectly) one or more required parameters for the function. In some embodiments, if the session required identifier 312 is true then a user session may be initiated upon triggering of the function 300. In other embodiments, the function may fail if a function requiring a function is called in a non-interactive session. Alternatively, in some embodiments, if the session required identifier 312 is set to false a user session is not initiated or the user session may be optional. In cases where the user session is optional, if the function is called in a non-interactive context at least a portion of the arguments may be filled in with default values, which may be predefined default values stored in the group-based communication system data store 162 along with the function object.

Figure 4:
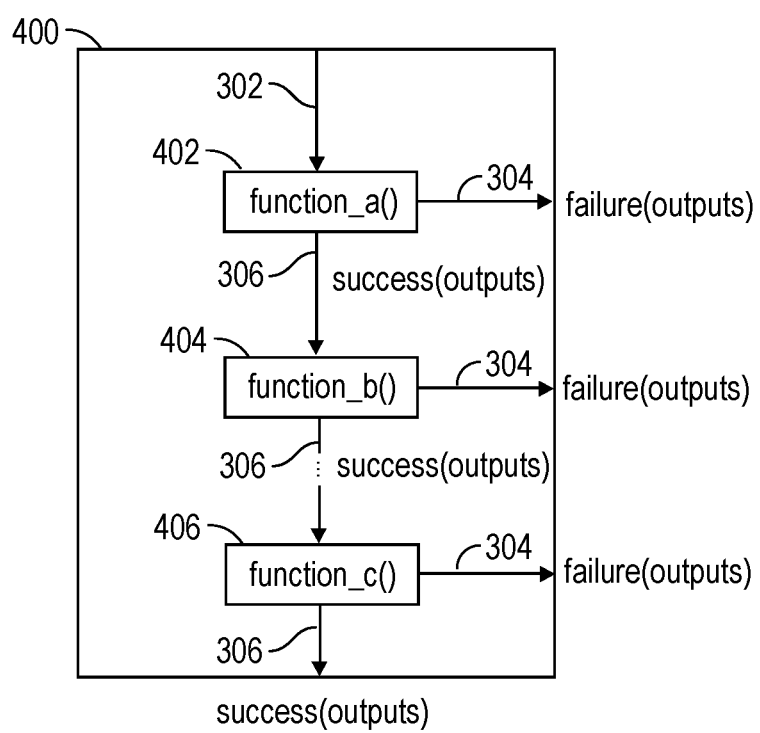
FIG. 4 depicts a sequence of functions relating to some embodiments of the invention.

Turning now to FIG. 4, a sequence of functions 400 is depicted in a workflow relating to some embodiments. Here, the sequence of functions 400 includes a plurality of n functions, such as a first function 402 (function_a( )), a second function 404 (function_b( )), and an nth function 406 (function_c( )). In some such embodiments, each function of the plurality of functions may generate either of an error 304 or outputs 306, based on the respective failure or success of the function. In some embodiments, the outputs 306 may be passed to the subsequent function, as shown. In some embodiments, the sequence of functions 400 is executed as a workflow within the group-based communication system. In some embodiments, each function of the sequence of functions 400 performs a different action and generates different outputs 306. In some embodiments, the nth function 406 may be the last function. Here, the output 306 of the nth function 406 is sent back to the group-based communication system server 158 as a set of return values. In some embodiments, functions may be composed when they are created, as described below with respect to FIGS. 7A and 7B.

Values may be passed between functions either directly or via success and/or error messages posted to an event channel of the group-based communication system. In some embodiments, a success message for a composed function may include additional information indicative of a subsequent function to be called, eliminating the need for state to be maintained outside of the function call itself. In some embodiments, the event channel may operate like a conventional channel of the group-based communication system, allowing a user to debug a function by joining the event channel like any other channel to monitor the success and error messages. In other embodiments, the event channel may be a hidden data layer of the ordinary group-based communication channel in which the function is invoked.

In some embodiments, each of functions 402, 404, and 406 may be either predefined functions built into the group-based communication system or custom, user-defined functions created by end-users. Accordingly, embodiments are contemplated where a user creates a sequence of functions 400 by selecting from a set of existing functions. Further, in some embodiments, the functions 402, 404, and 406 may be called from an automated workflow executed by a workflow application of the group-based communication system. Accordingly, automated workflows are contemplated that call a plurality of functions to perform a set of complex tasks within the group-based communication system.

An exemplary automated workflow is contemplated for some embodiments that provides a table to store information relating to users who have signed up for a service with a third party application. Here, the automated workflow may call upon a first function to create the table, a second function to prompt users to sign up for the service whenever a new user is added, and a third function to update the information on the table whenever a user has signed up for the service. Additionally, functions may be provided to return specific values stored on the table such that users can see who has signed up for the third party service.

In some embodiments, arguments are collected from the group-based communication system data store 162. For example, the arguments may include any of user information, status information of the group-based communication channel, external information from an external resource, or any combination thereof. It should be understood that other sources and types of arguments are also contemplated.

An example scenario illustrating the operation of the invention for some embodiments will now be described. For the sake of the example, a function has been defined for auto-filling a form with user information. Said function is triggered whenever a form is shared within the group-based communication system. Accordingly, a first user shares a form to be completed by a second user in a group-based communication channel and, in response to the file being shared, a trigger indication is received. After the trigger indication is received, arguments are collected. For the sake of the example, the collected arguments include a set of user information retrieved from the group-based communication data store, such as for example, the username, user job title, and other pieces of user information.

An HTTP request is generated and sent to the HTTP server 206. The HTTP request comprises the retrieved user information, information related to the form to be filled, as well as additional function-related information which is sent to the HTTP server 206. The HTTP server 206 executes the function, which, in this example, involves automatically filling at least one input field of the form with the user information. Accordingly, an HTTP callback is received including the auto-filled form and an indication of successful completion of the function. Next, the function is determined to be successful based on the received indication and a success event is generated. Alternatively, in a case where the function is not successfully completed (for example, if the information to be auto filled on the form was not accessible), an error message may be returned or a message notifying a user that the information must be provided manually. As described above, success or failure of the function may cause a success or failure event message to be posted to an event channel (or to an appropriate dedicated success channel or failure channel as appropriate).

Figure 5A:
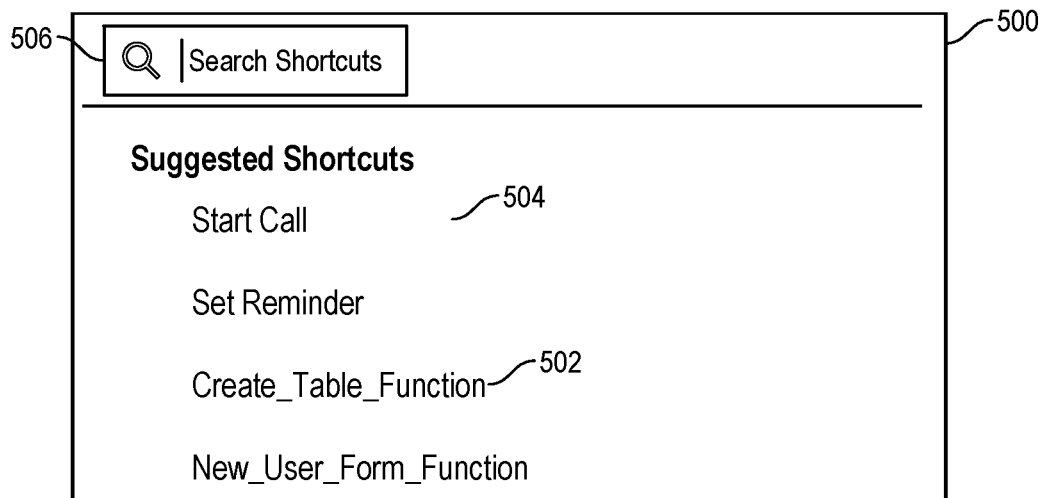
FIGS. 5A and 5B depict a user interface for initiating a function relating to some embodiments of the invention.

Turning now to FIG. 5A, an exemplary user interface 500 of the group-based communication system for initiating a function is depicted relating to some embodiments. The user interface 500 comprises a function shortcut 502. In some embodiments, the function shortcut 502 is associated with a trigger indication that initiates a function. In some embodiments, the function shortcut 502 may be accessed from a set of suggested shortcuts 504 presented to a user on the group-based communication system, as shown. Additionally, shortcuts may be searched using a shortcut search bar 506. Accordingly, embodiments are contemplated where users can search for specific functions using the search bar 506. In some embodiments, the function name 310 is displayed in the user interface 500 to indicate which function corresponds to the function shortcut 502. In some embodiments, a plurality of functions may be presented to the user within the set of suggested shortcuts along with additional shortcuts which may not be related to functions.

In some embodiments, the function shortcut 502 may be included as part of a popup window in the user interface 500, as shown. Alternatively, in some embodiments, the function shortcut 502 may be accessed by typing a slash command within a text entry box of the group-based communication system. For example, a developer user may call upon a function by typing a slash followed by a name or other identifier for a function within a text input field of the group-based communication system typically used to compose messages.

Figure 5B:
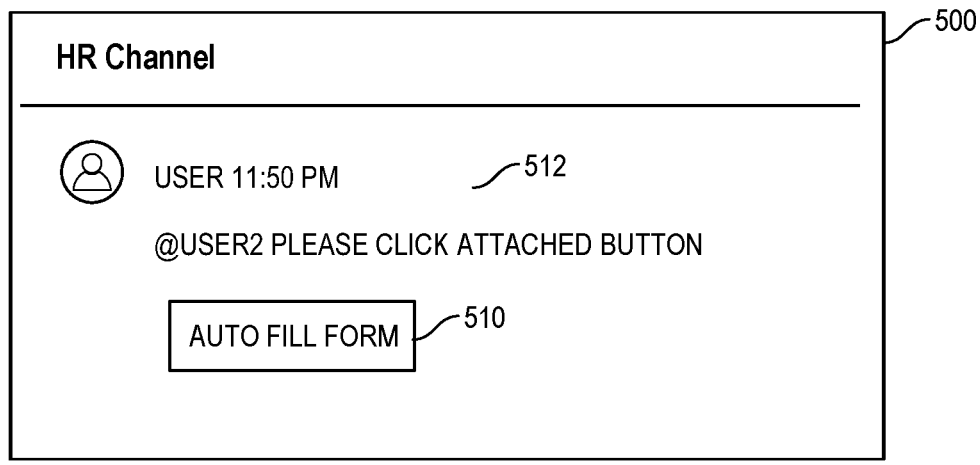

Turning now to FIG. 5B, the exemplary user interface 500 of the group-based communication system for initiating a function is depicted relating to some embodiments. In some embodiments, the user interface 500 comprises a function button 510 for initiating a function. Here, the function button 510 may be a trigger indication for a given function. In such embodiments, the function button 510 may be selected by a user clicking or tapping the function button 510 within the group-based communication system which initiates the function.

In some such embodiments, the function button 510 may be included within a message 512 in the group-based communication system, as shown. Accordingly, embodiments are contemplated where a user can share a function with other users by attaching the function button 510 to the message 512 within a channel of the group-based communication system. Alternatively, the function button 510 may be presented in other locations within the group-based communication system. It should be understood that, in some embodiments, functions may be initiated automatically without a user manually clicking a button or selecting a function shortcut, as will be discussed in detail below in reference to FIG. 5C.

Figure 5C:
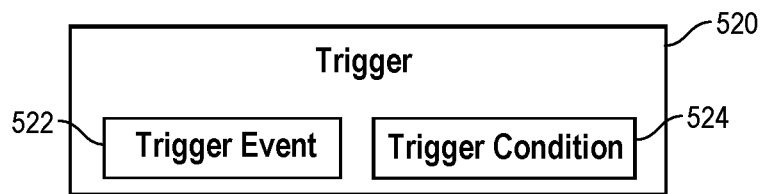
FIG. 5C depicts a trigger for a function relating to some embodiments of the invention.

Turning now to FIG. 5C, an exemplary automatic trigger 520 is depicted relating to some embodiments of the invention. In some embodiments, the trigger 520 comprises a trigger event 522 and at least one trigger condition 524. Accordingly, when a trigger event 522 occurs, the trigger conditions 524 will be checked, and if the trigger conditions 524 are satisfied, the function will be initiated. It should be understood that in some embodiments, a function may be associated with more than one trigger event 522 such that a variety of trigger events can initiate the function. Further, in some embodiments, the trigger event 522 may be an event within the group-based communication system or within an external application. Similarly, information related to the trigger conditions 524 may be retrieved from the group-based communication system or from an external application. For example, in some embodiments, the trigger conditions 524 are associated with variables stored within the group-based communication system data store 162. In some embodiments, a function may be included for presenting a form to a new user upon the new user joining a specific channel of the group-based communication system. Such a function will be described in detail below.

In one example, an administrator user of an organization has defined a function for automatically prompting new users to fill out a form relating to initial hiring paperwork, such as for example, a W4 form. In such an example, the administrator user has set the function to be active for a human resources channel to which all members of the organization are added when hired. Accordingly, the administrator user may define a trigger event for the function to be activated whenever a new user is added to the human resources channel. The administrator user may wish that the function only be carried out during regular business hours to ensure that the new users are active when the prompt to fill out the form is sent. Accordingly, the administrator user may define a trigger condition for the function that is satisfied when the time for the trigger event is between the hours of 7:00 AM to 7:00 PM on Monday through Friday. In such embodiments, it may further be desirable to schedule a subsequent trigger event to take place during these hours if the initial trigger event is activated outside of these hours to ensure that the new user still receives the prompt to fill out the form.

In addition to the manual and automatic triggers described above, functions may also be triggered by a call from another function, as described in reference to FIG. 4. Additionally, in some embodiments, a single function may be initiated by a variety of different types of triggers. For example, a function for storing an email address in a spreadsheet may be triggered automatically by receiving an email from a new contact or be triggered manually by a user searching and selecting the function. Further still, functions may be called by a workflow application of the group-based communication system executing an automated workflow. Here, the name or ID for the function may be stored in a set of instructions for the automated workflow, for example, in the group-based communication system data store 162, such that the automated workflow calls and triggers the function when executed.

Figure 6:
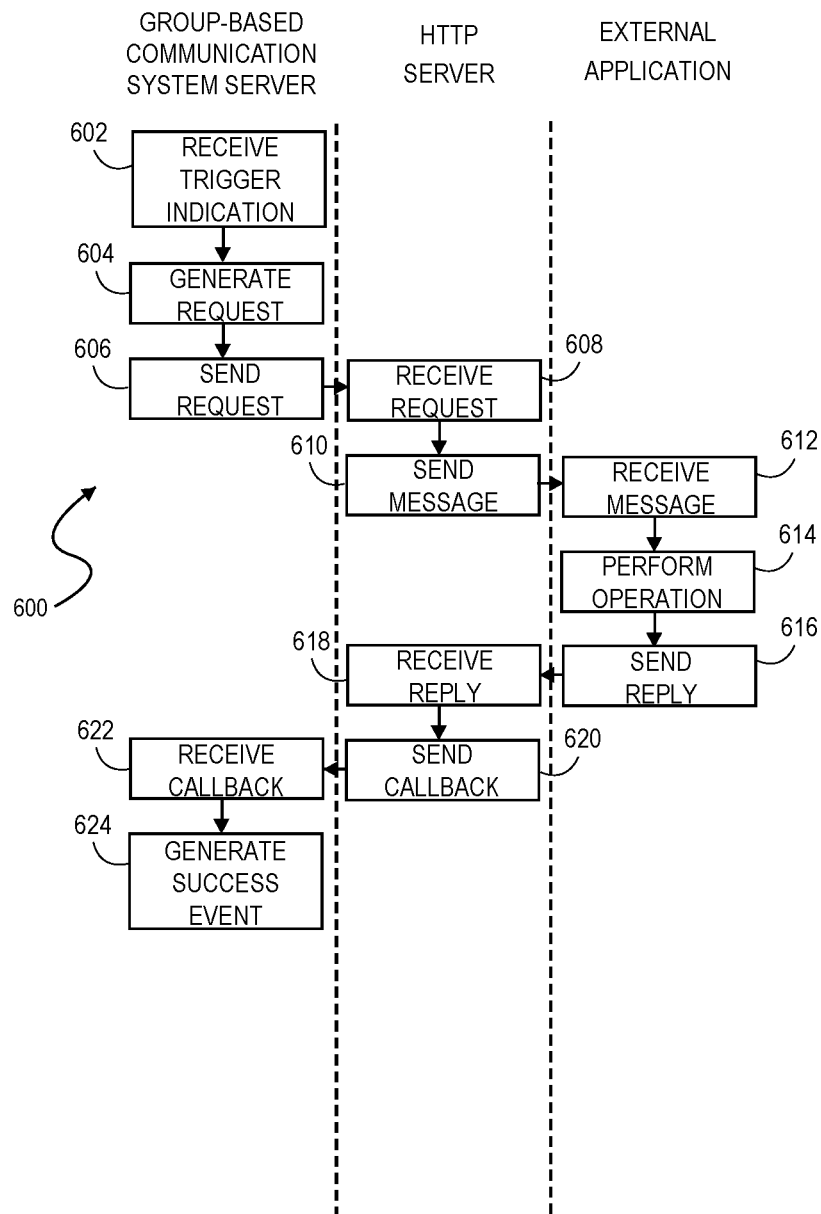
FIG. 6 depicts a swim lane diagram illustrating component responsibility flow for calling a function within a group-based communication system relating to some embodiments of the invention.

Turning now to FIG. 6, a swim lane diagram illustrating component responsibility flow for calling a function within a group-based communication system is depicted relating to some embodiments and referred to generally by reference numeral 600. At step 602, a trigger indication is received by the group-based communication system server 158. Such a trigger indication may be associated with any one of the manual or automatic function initiation scenarios described above. For example, the trigger indication may be received in response to a user selecting the function shortcut 502, a user selecting the function button 510, or automatically in response to a trigger event where the trigger conditions have been satisfied. Additionally, in some embodiments, the function may be triggered by an automated workflow or by a previously executed function, as described above. In some embodiments, the trigger indication may be an indication that one or more trigger conditions have been satisfied. In some embodiments, the indication is received via an event channel of the group-based communication system. The trigger condition indication may be associated with a trigger condition being satisfied. For example, if the trigger condition is associated with a new member being added to a particular channel within the group-based communication system, the trigger condition may be satisfied when a new member joins the channel. In such a case, an indication may be sent over the event channel in response to the trigger condition being satisfied. Alternatively, if the trigger condition is the successful completion of another function, the trigger condition may be satisfied when the appropriate success event is posted to the event channel.

In some embodiments, trigger conditions may be selected from user-defined or predefined triggers. For example, a trigger condition may be associated with a user sending a message within a particular channel of the group-based communication system. Accordingly, if a message is sent within that channel the trigger condition is satisfied. It should be understood that a variety of types of trigger conditions are contemplated. For example, trigger conditions may be associated with additional users joining a channel, a new channel being created, an additional organization joining a channel, a reaction to a message, or another event within the group-based communication system. Broadly, a trigger may be any event that matches a predefined condition. These events may originate with a user action (a user clicking on a button in the user interface or invoking a slash command in a message), an automated system action (for example, a regularly scheduled recurring event), or a custom action (for example, a webhook called by a third-party integration). The event for the trigger may be included as an argument to the triggered function. For example, if the trigger condition is a user joining a particular channel, then the user identifier and channel identifier may be passed as arguments to the function.

In response to receiving the trigger indication, the group-based communication system server 158 generates an HTTP request at step 604 and sends the HTTP request to the HTTP server 206 at step 606. The HTTP request may comprise a variety of pieces of information such as information identifying a function, information identifying arguments for the function, information identifying actions for the function, authentication information, as well as other function related information.

The HTTP server 206 receives the HTTP request at step 608. In some embodiments, the HTTP server 206 sends a message to the external application 210 at step 610 based on the HTTP request received at step 608. In some embodiments, the message comprises a variety of pieces of information such as, information related to actions to be performed within the external application 210, authentication information to authenticate the function within the external application, or other function related information. The external application 210 receives said message at step 612 and performs an operation or set of actions at step 614. In some embodiments, the message may include instructions to perform an operation within the external application 210. For example, in one embodiment, the external application 210 is spreadsheet software and the message from the HTTP server 206 contains instructions to write a value to a particular cell within a spreadsheet and/or read a value from another cell. At step 616, the external application 210 sends a reply back to the HTTP server 206. In some embodiments, the reply includes information such as a confirmation that the operation was performed at step 614 or a return value. For example, the value read from the spreadsheet may be returned to the HTTP server 206 in the reply.

At step 620, the HTTP server 206 sends a callback to the group-based communication system server 158. It should be understood that, in some embodiments, the HTTP server 206 may not communicate with an external application 210. Accordingly, steps 610-618 may be skipped in such embodiments and replaced with a step of processing by the HTTP server 206. Here, the HTTP server 206 may perform an operation associated with the function.

At step 622, the callback is received by the group-based communication system server 158. In some embodiments, the callback includes one or more return values associated with the function. In response to receiving a success indication within the callback, a success event is generated by the group-based communication system server 158 at step 624. In some embodiments, the one or more return values indicate a successful completion of the function. Alternatively, if an error is returned in the callback an error event may be generated at step 624 instead of a success event.

Such an error event may include displaying an error message within the group-based communication system, as discussed above.

Figure 7A:
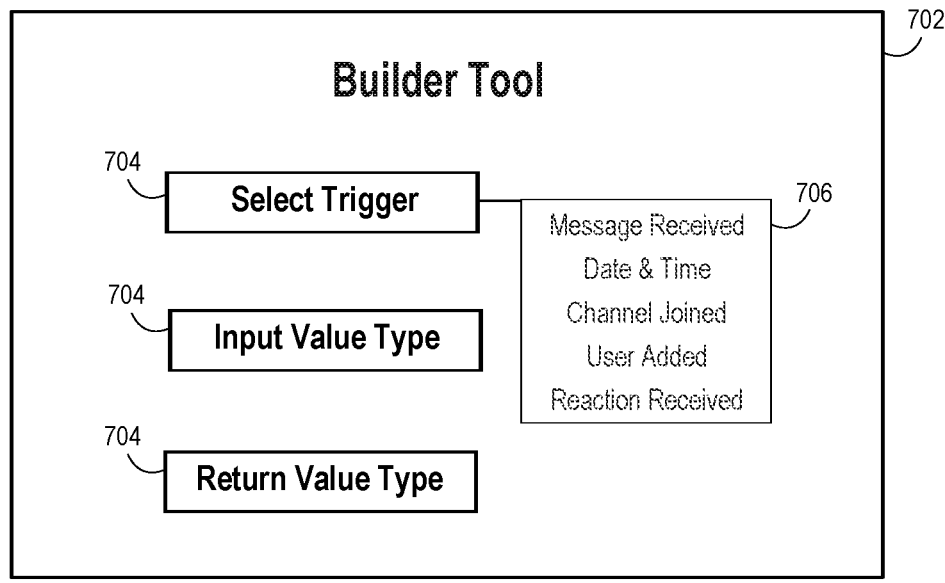
FIG. 7A depicts an exemplary screenshot illustrating an end user interface relating to some embodiments of the invention.

Turning now to FIG. 7A, an exemplary screenshot of an end user interface 702 of the group-based communication system is depicted relating to some embodiments. The end user interface 702 may be displayed to a user on one of client devices 152, 154, or 156. The end user interface 702 may be especially desirable for new users and end users who are not experienced developers. Accordingly, the end user interface 702 may allow a user to define or edit a function within the group-based communication system without requiring the user to write code or use advanced software techniques.

In some embodiments, the end user interface 702 comprises a plurality of clickable buttons 704 providing a simple interface for a user to select parameters for a function. In some embodiments, a dropdown menu 706 may be selectively displayed in response to a user clicking one of the plurality of buttons 704. The dropdown menu 706 may display a plurality of options for a user to select. It should be understood that the group-based communication system may be displayed, for example, on a touch screen of a mobile device. Here, the user touching the screen is comparable to the user clicking an item. Accordingly, in some embodiments, the dropdown menu 706 may be displayed in response to a user either clicking button 704 using a mouse or tapping button 704 on a touchscreen display of one of client devices 152, 154, or 156.

In some embodiments, the end user interface 702 may comprise a prompt for a user to select a variable. Here, the variable may be a parameter accessible within the group-based communication system which can be used as an input for the function. For example, the user may select an email address as a variable to be used as an input for the function. Accordingly, a situation is contemplated where a user selects an email address which was used to call the function as a variable to be used as an input for a function. Here, a function may be created which returns the email address of the user who called the function. For example, a function may be triggered by a user responding to a message within the group-based communication system. Here, the exemplary function could be used to return the email address associated with the user account which the user responded with.

In some embodiments, the end user interface 702 allows a user to select from a set of predefined functions and saved user-defined functions. Accordingly, embodiments are contemplated where a user interacts with user interface 702 to define a set of functions similar to sequence of functions 400 of FIG. 4, by selecting existing functions from the set of functions that are either predefined or user-defined.

Figure 7B:
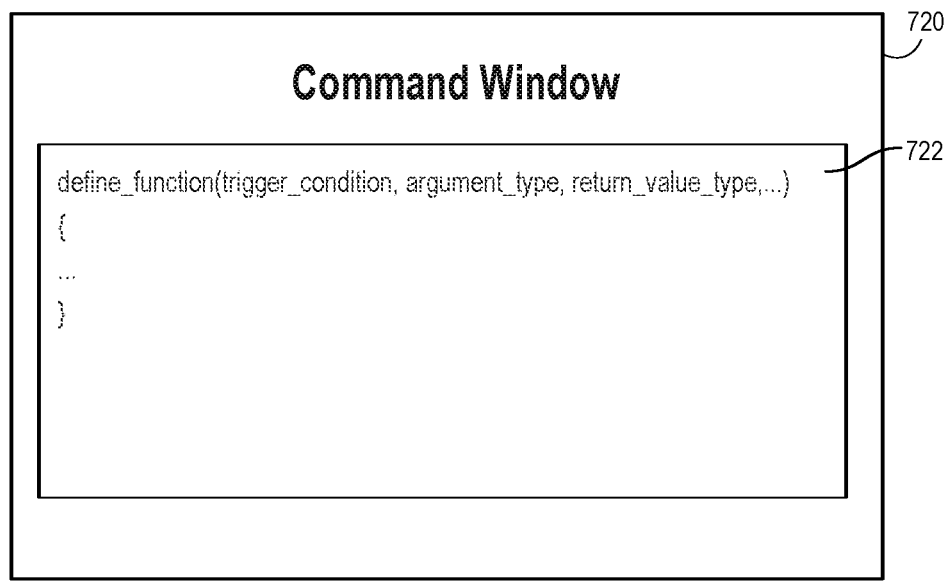
FIG. 7B depicts an exemplary screenshot illustrating a developer interface relating to some embodiments of the invention.

Turning now to FIG. 7B, a developer interface 720 of the group-based communication system is depicted relating to some embodiments. The developer interface 720 may be desirable to allow advanced users to define functions within the group-based communication system using code. Accordingly, the developer interface 720 may be compatible with a variety of coding languages which may be hosted on the group-based communication system. For example, within the developer interface 720 a command window 722 may be provided allowing a user to input code to define a function. In some embodiments, the developer interface 720 may interface with an external developer application to allow a user to create functions by writing code in the external developer application.

In some embodiments, the developer interface 720 may allow users to import information from external repositories to define functions within the command window 722. Accordingly, functions may be easily shared between users. For example, a user may copy and paste a link to an online repository storing a function template into the command window so that the online repository may be accessed and the function template retrieved.

It should be understood that embodiments are contemplated where both the end user interface 702 and the developer interface 720 are included allowing a plurality of different users to create and define functions within the group-based communication system. Accordingly, users may be given the ability to select either of the end user interface 702 or the developer interface 720 when defining a function. Additionally, in some embodiments, either of the end user interface 702 or the developer interface 720 may be displayed to the user automatically based on user information associated with the user that is stored within the group-based communication system data store 162. For example, if a user is known to be an advanced software developer based on the user's role within the group-based communication system, then the developer interface 720 may automatically be displayed when the user wishes to define a new function. Alternatively, if a user is a standard user, then the end user interface 702 may be automatically displayed to the user while defining a new function.

Further, embodiments are contemplated in which a single user may use both the developer interface 720 and the end user interface 702 to define a function. For example, a user may define a function within the developer interface 720 by typing or pasting code. The function may then be stored or registered within the group-based communication system such that the function can be accessed from the end user interface 702. Here, the same user or another user may access the function from the end user interface 702. Accordingly, embodiments are contemplated where advanced users define complex functions using the developer interface 720 which can be called upon by end users via the end user interface 702.

In some embodiments, a function directory may be included, which may be stored on the group-based communication system data store 162. The function directory may comprise a plurality of functions available to be installed by users and external applications. In some embodiments, users and external applications may publish functions to the function directory such that the functions may be installed by other users of other organizations. Accordingly, if a useful function is created by a first organization, the first organization may publish the function such that a second organization may install the function from the function directory.

Figure 8:
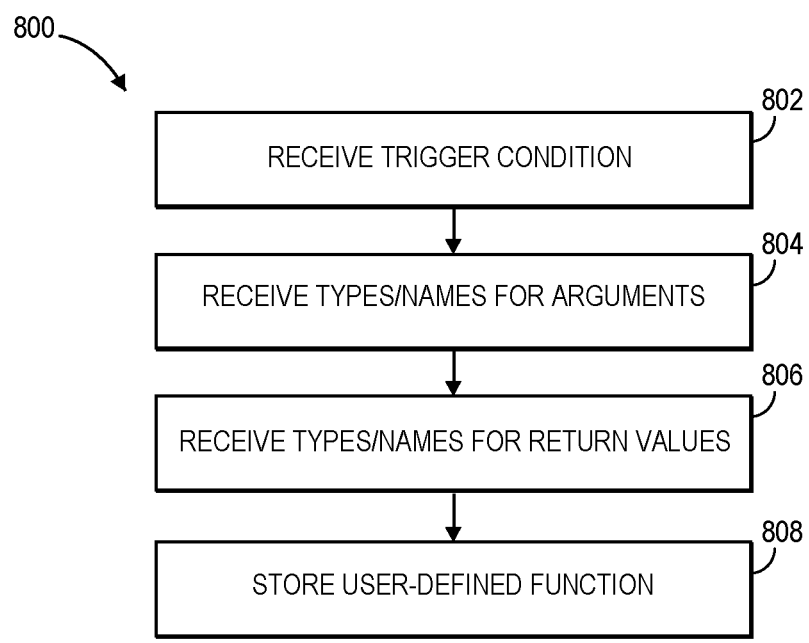
FIG. 8 depicts a method for defining a function relating to some embodiments of the invention.

Turning now to FIG. 8, a method for defining a function within the group-based communication system is depicted relating to some embodiments and referred to generally by reference numeral 800. At step 802, one or more trigger conditions for the function are received from a user. It should be understood that in some embodiments, the trigger conditions for the function may be received via one of the end user interface 702 or the developer interface 720. Alternatively, in some embodiments, the trigger conditions may be received via a separate trigger configuration interface for setting triggers for functions. Accordingly, users may operate the trigger configuration interface to assign triggers to a function. Here, users may select which triggers should be active for a given function. For example, users may operate the trigger configuration interface to assign an automatic trigger event for when a new user is added to a channel in the group-based communication system. Further, the user may assign a manual shortcut trigger for the function such that other users may initiate the function manually in the group-based communication system by selecting the shortcut, as described for function shortcut 502 of FIG. 5A.

At step 804, types and names for one or more arguments of the function are received from the user. At step 806, types and names for one or more return values of the function are received from the user. In some embodiments, the trigger conditions and the types and names for each of the arguments and the return values are received from the user through one of the end user interface 702 or the developer interface 720, as shown in FIGS. 7A and 7B respectively. At step 808, the user-defined function is stored. In some embodiments, the user-defined function including the trigger conditions and types and names for each of the arguments and the return values is stored in the group-based communication system data store 162.

In some embodiments, the user-defined function stored at step 808 can be retrieved and used within the group-based communication system. In some embodiments, user-defined functions can be shared between users and between organizations within the group-based communication system. Accordingly, for example, a first user of a first organization may create a user-defined function for auto-filling user information on a form and share the function with other users of the first organization as well as with users of a second organization.

It should be understood that the example functions described herein are just a few examples and that a variety of additional functions with different parameters not described herein are also contemplated in order to cater for specific scenarios within the group-based communication system.

Figure 9A:
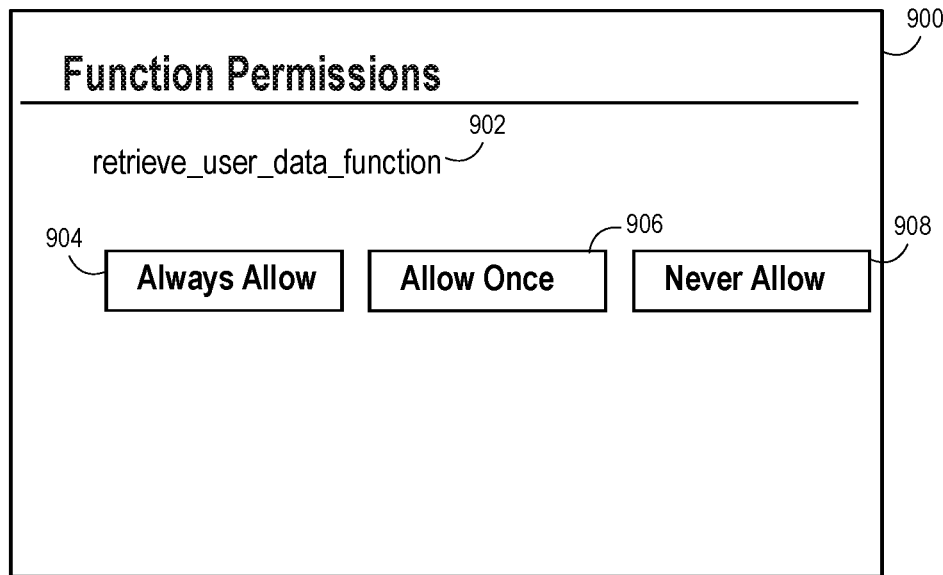
FIGS. 9A and 9B depict a function permission configuration user interface relating to some embodiments of the invention.
Figure 9B:
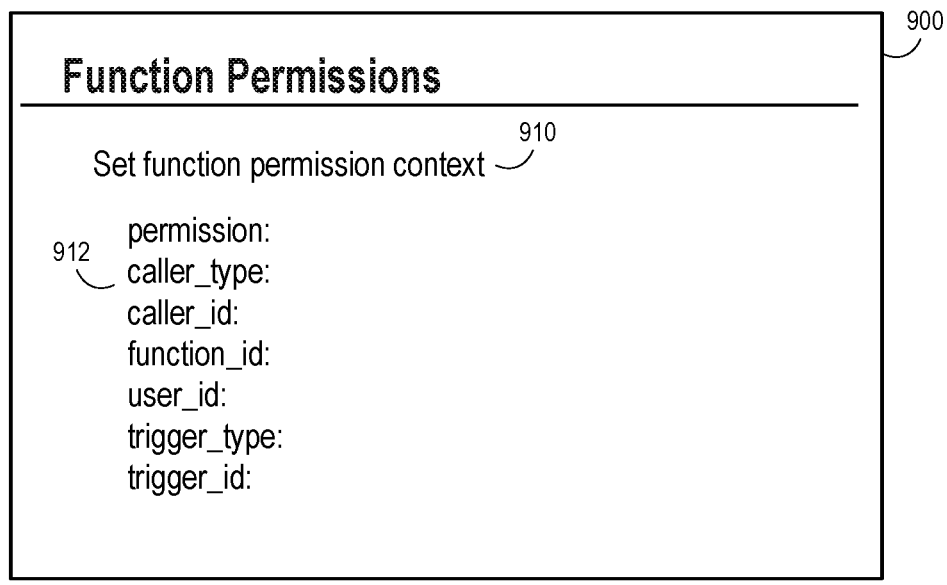

Turning now to FIGS. 9A and 9B, a function permission configuration user interface 900 is depicted relating to some embodiments of the invention. In some embodiments, it may be desirable to restrict access to certain functions to prevent sensitive data from being shared or lost. For example, in some embodiments, certain built-in functions may have access to sensitive user information stored in the group-based communication system data store 162. Accordingly, it may be desirable to restrict functions based on a function permission. For example, a function permission may be granted only to certain users of the group-based communication system or to certain external applications, such as, for example, external application 210. Here, functions may be allowed or denied based on the function permissions. Additionally, in some embodiments, it may be desirable to restrict functions based on a specific context for the function. For example, an administrator user may set a built-in function to access user A's data to be always allowed when called from an automated workflow that is triggered by user B. Further, the administrator user may set the same built-in function to be always denied when called from the external application 210.

In some embodiments, the function permission configuration user interface 900 comprises a function name such as the exemplary function name 902, as shown in FIG. 9A. The function name 902 indicates the function for which permissions are currently being configured. In some embodiments, the function permission configuration user interface 900 further comprises an always allow button 904, an allow once button 906, and a never allow button 908. Accordingly, a user can select one of these buttons to set a corresponding permission for the function. For example, if a user is editing permissions for a retrieve user data function and wishes to always allow the function, the user may select the always allow button 904. Alternatively, if the user wishes that the function be allowed just for a current execution the user may select the allow once button 906 such that the function will be allowed but subsequent executions of the function may not be allowed or may trigger an additional prompt to the function permission configuration user interface 900. Further still, if the user wishes that the function should never be executed the never allow button 908 may be selected.

It should be understood that, in some embodiments, the function permission configuration user interface 900, as depicted in FIG. 9A, may be presented to a user upon execution of a function if the function is currently not allowed such that the user is prompted to edit the permission settings of the function. However, in some embodiments, the prompt may only be activated for the first execution of the function and subsequent executions will not present the prompt.

In some embodiments, context metadata may be used to determine whether a function should be allowed. In such embodiments, context metadata may comprise a permission, a caller type, a caller ID, a function ID, a user ID, a trigger type, a trigger ID, or other function related information, such as, a channel ID. Accordingly, it may be desirable to provide the function permission configuration user interface 900 such that an administrator user or a user with access can configure function permissions to allow and deny functions in specific contexts based on context metadata.

Additionally, in some embodiments, functions may further be restricted based on user roles or on a user-to-user basis. For example, user A may have access to a first and second function while user B only has access to the first function. Here, an administrator user or a user with access may configure function permissions on the function permission configuration user interface 900 to grant or revoke access to functions for specific users, user roles, or other groups of users.

In some embodiments, a more granular approach to setting function permissions may be desirable. Accordingly, the function permission configuration user interface 900, as shown in FIG. 9B, may be presented to a user. In such embodiments, the function permission configuration user interface 900 comprises a text description 910, which may read "Set function permission context", as shown, for example. The function permission configuration user interface 900 may further comprise a list of context metadata which may be defined by the user. Accordingly, the user may set function permissions based on specific contexts within the group-based communication system.

In some embodiments, a function may request access during execution of the function. For example, if a function is triggered to retrieve sensitive data for user A the function may request access to the sensitive data from user A when the function is triggered. Accordingly, user A may choose to either allow or deny access to the function. Here, the function may pause execution until a response is received from user A and if user A allows the function will continue and retrieve the sensitive information. Alternatively, if user A denies the function, the function may be stopped or return an error.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by

Letters Patent includes the following:

1. One or more non-transitory computer-readable media storing that store computer-executable instructions that, when executed by a processor, perform a method for providing reusable functions within a group-based communication system, the method comprising:

receiving, from a first user of a first organization, a first function definition for a first function, the first function definition comprising one or more trigger conditions for the first function;

receiving, from a second user of a second organization distinct from the first organization, a second function definition for a second function, the second function definition comprising one or more trigger conditions for the second function;

invoking the first function within an external application responsive to an API call from a group-based communication system application;

receiving a callback including one or more return values for the first function after execution of the first function based on an asynchronous request; and responsive to receiving the one or more return values, invoking the second function with function parameters associated with the one or more return values.

2. The one or more non-transitory computer-readable media of claim 1, wherein at least one of the first function and the second function performs a write to a group-based communication system table, and wherein the group-based communication system table is one of a plurality of tables associated with the group-based communication system application.

3. The one or more non-transitory computer-readable media of claim 2, wherein each table of the plurality of tables associated with the group-based communication system application includes a respective plurality of data types for interaction with the reusable functions.

4. The one or more non-transitory computer-readable media of claim 3, wherein the group-based communication system table stores a set of function related information including one or more arguments, the one or more return values, and event data associated with a triggering event.

5. The one or more non-transitory computer-readable media of claim 2, further comprising triggering a validation function responsive to performing the write to the group-based communication system table.

6. The one or more non-transitory computer-readable media of claim 2, wherein the first function is invoked with function parameters obtained by performing a read from the group-based communication system table.

7. The one or more non-transitory computer-readable media of claim 1, retrieving a value from a persistence table based at least in part on one or more arguments for the first function collected during a triggering event associated with the one or more trigger conditions of the first function.

8. A method for providing reusable functions within a group-based communication system, the method comprising:

receiving, from a first user of a first organization, a first function definition for a first function, the first function definition comprising one or more trigger conditions for the first function;

receiving, from a second user of a second organization distinct from the first organization, a second function definition for a second function, the second function definition comprising one or more trigger conditions for the second function;

invoking the first function within an external application responsive to an API call from a group-based communication system application;

receiving a callback including one or more return values for the first function after execution of the first function based on an asynchronous request; and responsive to receiving the one or more return values, invoking the second function with function parameters associated with the one or more return values.

9. The method of claim 8, wherein at least one of the first function and the second function performs a write to a group-based communication system table, and wherein the group-based communication system table is one of a plurality of tables associated with the group-based communication system application.

10. The method of claim 9, wherein each table of the plurality of tables associated with the group-based communication system application includes a respective plurality of data types for interaction with the reusable functions.

11. The method of claim 10, wherein the group-based communication system table stores a set of function related information including one or more arguments, the one or more return values, and event data associated with a triggering event.

12. The method of claim 9, further comprising triggering a validation function responsive to performing the write to the group-based communication system table.

13. The method of claim 9, wherein the first function is invoked with function parameters obtained by performing a read from the group-based communication system table.

14. The method of claim 8, retrieving a value from a persistence table based at least in part on one or more arguments for the first function collected during a triggering event associated with the one or more trigger conditions of the first function.

15. A system for providing functions within a group-based communication system, the system comprising:

a data store associated with the group-based communication system; and at least one processor programmed to execute a method for providing reusable functions within the group-based communication system, the method comprising:

receiving, from a first user of a first organization, a first function definition for a first function, the first function definition comprising one or more trigger conditions for the first function;

receiving, from a second user of a second organization distinct from the first organization, a second function definition for a second function, the second function definition comprising one or more trigger conditions for the second function;

invoking the first function within an external application responsive to an API call from a group-based communication system application;

receiving a callback including one or more return values for the first function after execution of the first function based on an asynchronous request; and responsive to receiving the one or more return values, invoking the second function with function parameters associated with the one or more return values.

16. The system of claim 15, wherein at least one of the first function and the second function performs a write to a group-based communication system table, and wherein the group-based communication system table is one of a plurality of tables associated with the group-based communication system application.

17. The system of claim 16, wherein each table of the plurality of tables associated with the group-based communication system application includes a respective plurality of data types for interaction with the reusable functions.

18. The system of claim 17, wherein the group-based communication system table stores a set of function related information including one or more arguments, the one or more return values, and event data associated with a triggering event.

19. The system of claim 16, further comprising triggering a validation function responsive to performing the write to the group-based communication system table.

20. The system of claim 16, wherein the first function is invoked with function parameters obtained by performing a read from the group-based communication system table.

* * * * *